United States Patent
Root

[15] 3,686,840
[45] Aug. 29, 1972

[54] RIDING LAWN MOWER
[72] Inventor: George R. Root, Baxter Springs, Kans.
[73] Assignee: Root Manufacturing Company, Inc., Baxter Springs, Kans.
[22] Filed: July 28, 1970
[21] Appl. No.: 58,863

[52] U.S. Cl. .............................. 56/15.8, 56/DIG. 22
[51] Int. Cl. ............................................. A01d 35/26
[58] Field of Search............ 56/10.8, 11.3, 11.6, 11.8, 56/12.7, 13.6, 14.7, 14.8, 14.9, 15.3, 15.7, 15.8, 15.9, 16.2, 16.3, 16.7, 17.1, 6

[56] References Cited

UNITED STATES PATENTS

| | | |
|---|---|---|
| 2,924,928 | 2/1960 | Rhoades et al. ......... 56/15.8 X |
| 3,123,961 | 3/1964 | Kamlukin ............... 56/14.7 X |
| 2,972,850 | 2/1961 | Ariens et al............. 56/15.8 X |

*Primary Examiner*—Antonio F. Guida
*Attorney*—Fishburn, Gold and Litman

[57] ABSTRACT

A pair of horizontally extending, laterally spaced apart suspension bars are secured at the front ends thereof to the pivotally mounted front axle adjacent the front wheels and have independent rear wheels for trailing support. The mower blade housing is adjustably hung from the suspension bars and lateral stability is maintained through pivotal arms extending between the rear ends of the suspension bars and the center of the mower rear frame.

7 Claims, 4 Drawing Figures

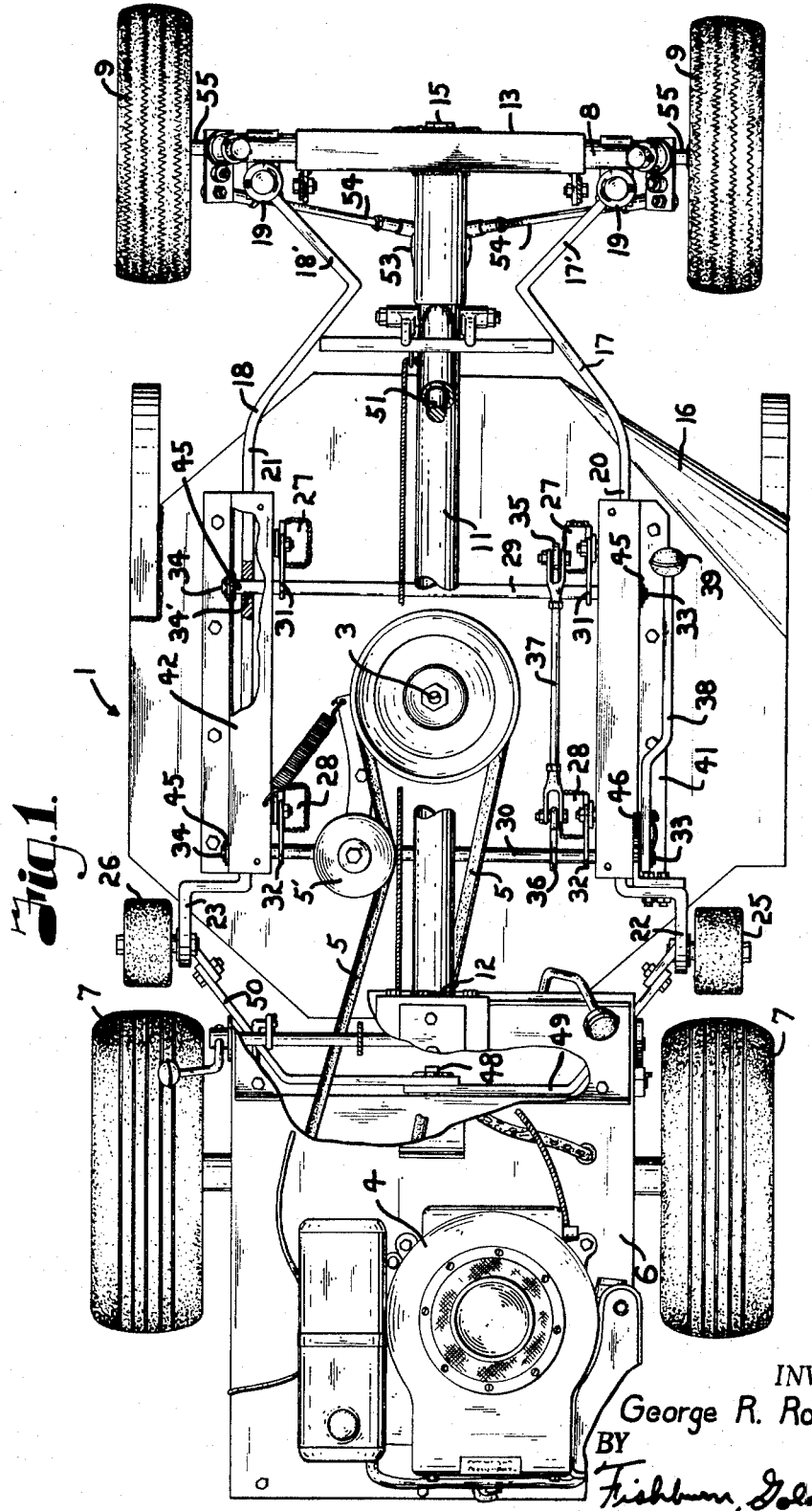

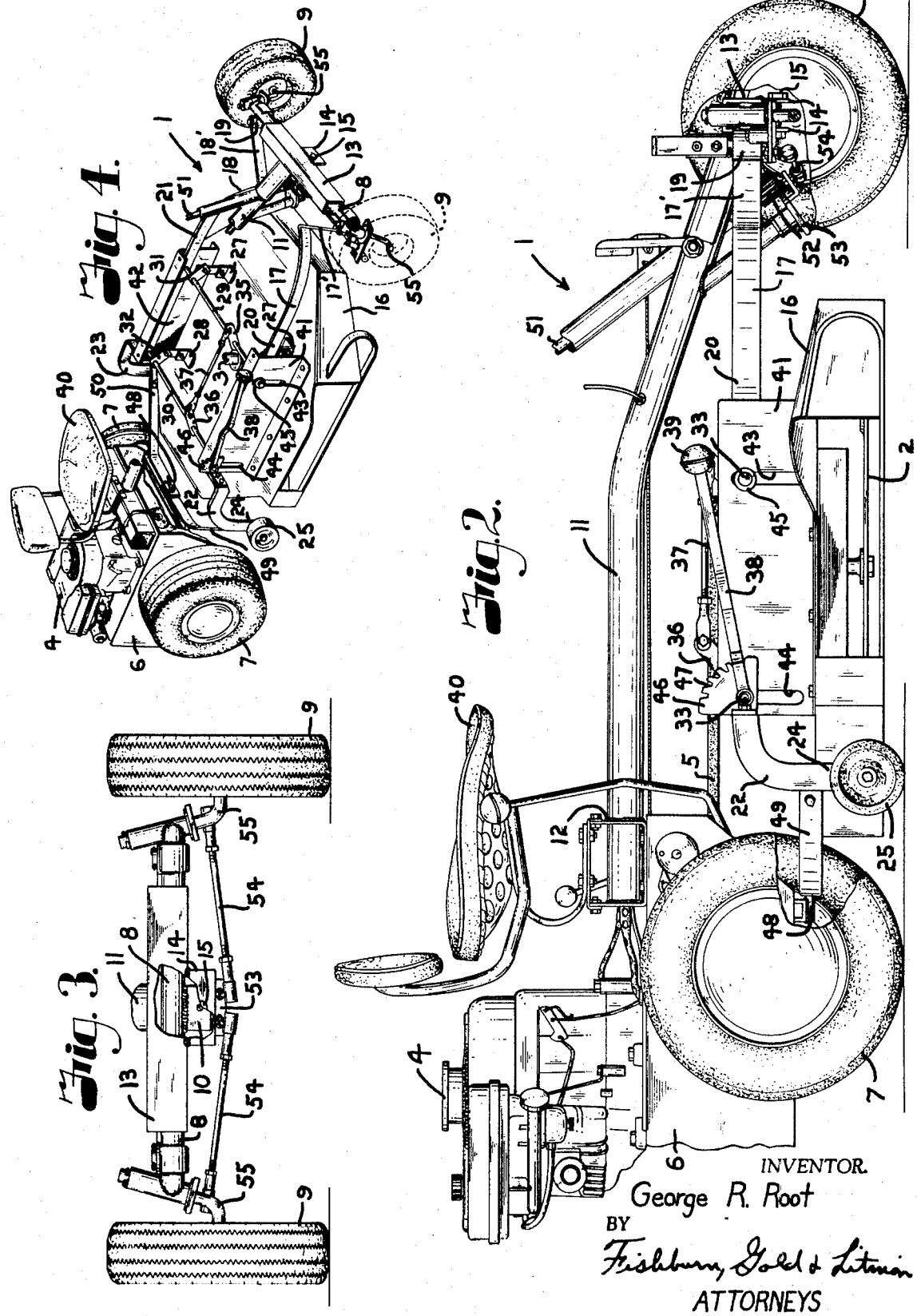

RIDING LAWN MOWER

This invention relates to riding lawn mowers and more particularly to improved structure for supporting the mower blade housing.

Heretofore, it has been difficult to obtain convenient vertical adjustability of the mower blade housing combined with housing stability and reliable structure adapted to reduce the tendency to "scalp" the grass on uneven terrain.

This invention provides ease of blade housing adjustment plus high stability with compensation for uneven terrain to reduce "scalping" by the use of a pair of elongated horizontal suspension bars connected at front ends thereof to a pivotable front axle supporting the mower front wheels and supported at the rear ends thereof by trailing wheels independent of the mower rear wheels. The blade housing is hung from the suspension bars in a manner providing convenient vertical adjustment from the seat of the mower and lateral stability of the housing support arrangement is provided through the use of pivotable arms connected to the rear of the suspension bars and to the center portion of the mower rear frame.

The principal objects of the present invention are: to provide a riding lawn mower having a blade housing suspension responsive to uneven terrain to reduce the tendency for "scalping;" to provide such a mower assembly wherein the blade housing is easily and simply adjustable in height through a single lever operable from the operator's seat; to provide such mowing apparatus wherein the blade housing is highly stable and trails accurately behind the front wheels of the mower; and to provide such a riding mower which is relatively simple and inexpensive in construction and yet well adapted for its intended purpose.

Other objects and advantages of this invention will become apparent from the following description taken in connection with the accompanying drawings wherein are set forth by way of illustration and example certain embodiments of this invention.

FIG. 1 is a fragmentary plan view of a riding mower embodying this invention particularly showing the relationship between the front wheels, blade housing suspension structure and blade housing.

FIG. 2 is a fragmentary side elevation with portions broken away to show additional details of the housing suspension structure.

FIG. 3 is a fragmentary front elevational view particularly showing the pivotal front axle for supporting the front ends of the blade housing suspension bars.

FIG. 4 is a fragmentary perspective view of the mower.

Referring to the drawings in more detail:

The reference numeral 1 generally indicates a riding lawn mower embodying this invention. The mower 1 is the type having a horizontal rotary blade 2 rotatable on a vertical axis 3 driven by a suitable engine 4 through a drive belt 5. An idler pulley 5' maintains the belt 5 in driving engagement. The mower 1 has a rear frame portion 6 upon which the engine 4 is mounted and supported between a pair of ground contacting rear wheels 7. A rigid front axle rod 8 is supported between a pair of front ground contacting wheels 9 and includes a central downwardly projecting ear 10, FIG. 3, for pivotally mounting the axle 8 to permit transverse pivotting or rocking as described below.

An elongated rigid frame member 11 extends longitudinally between the rear frame portion 6 and the front axle rod 8. The frame member 11 is rigidly fixed to the rear frame portion by suitable structure 12 and terminates at the front end thereof in a transversely extending inverted channel 13 receiving the front axle rod 8 upwardly therein. The channel 13 has downwardly projecting ears 14 aligned with the front axle rod ear 10. A generally horizontal bolt 15 projects through the respective ears 10 and 14, thereby mounting the front axle rod 8 with respect to the frame member 11 but permitting the axle rod to rock about a horizontal axis so as to permit the front wheels 9 to move generally vertically in opposite directions about the frame member 11. The side walls of channel 13 support the front axle rod 8 against excessive forward and rearward motion with respect to the mower but permit the rocking noted.

The blade 2 is supported within a blade housing 16 positioned between the front axle rod 8 and the rear frame portions 6. Suspension structure for the blade housing 6 includes a pair of elongated, rigid, laterally spaced apart suspension bars 17 and 18 having front ends 19 respectively supported in an elevated position on the front axle rod 8 adjacent the front wheels 9. The suspension bars 17 and 18 project toward each other at 17' and 18' to clear the wheels 9 during turning. The bars 17 and 18 also have intermediate or body portions 20 and 21 extending horizontally rearwardly of the front axle rod 8 in parallel relation and rear ends 22 and 23 curving outwardly and downwardly adjacent the rear wheels 7 and terminating adjacent the ground at 24. Ground contacting support wheels 25 and 26 are mounted on the suspension bar rear ends at 24 and provide trailing support for said suspension bars.

A forward pair 27 and rearward pair 28 of laterally spaced apart aligned lugs are secured to the top surface of the blade housing 16 and extend upwardly therefrom. Front and rear torsion bars 29 and 30 extend in parallel spaced apart relation transversely of the mower and over the blade housing 16 near the respective pairs of lugs 27 and 28. The torsion bars 29 and 30 each have a pair of parallel, spaced apart crank arms 31 and 32 projecting radially and generally forwardly therefrom and pivotally connected through intermediate links to the respective pairs of lugs 27 and 28. The torsion bars 29 and 30 have opposite ends 33 and 34 projecting through the respective suspension bars 17 and 18 and forming rotatable bearing connections 34' therewith.

Radially and generally upwardly projecting crank arms 35 and 36 are located respectively on the torsion bars 29 and 30 in longitudinally aligned relation with the frame member 11. An adjustable tension link 37 is pivotally connected at opposite ends thereof to the crank arms 35 and 36 and thereby prevents rotation of the torsion bars 29 and 30 independently of each other. An adjusting lever 38 is rotatably fixed at one end thereof to the end 33 of the rear torsion bar 30 and has a knob 39 on the other end, the knob being conveniently located for grasping by the mower operator when occupying the mower seat 40.

Upstanding, parallel, spaced apart panels 41 and 42 are fixed to the upper surface of the blade housing 16 and extend longitudinally of the mower adjacent respective opposite ends 33 and 34 of the torsion bars 29 and 30. Vertical slots 43 and 44 are formed in the respective panels 41 and 42 and receive the torsion bar ends 33 and 34 therethrough. Guide members 45 are secured to the respective torsion bar ends 33 and 34 and slideably engage the walls forming the slots 43 and 44 for permitting relative vertical movement therebetween but preventing substantial lateral movement of the blade housing with respect to the suspension bars 17 and 18.

A position locking device 46 is fixed to the panel 41 near the end 33 of the rear torsion bar 30 and has a plurality of circumferentially spaced notches 47 selectively engageable with suitable structure on the adjusting lever 38 to lock the lever in various desired circumferential positions. A variation in the circumferential position of the adjusting lever 38 produces a rotation in the rear torsion bar 30 which is reflected through the link 37 in a corresponding rotation of the front torsion bar 29. The noted rotations of the torsion bars 29 and 30 cause a predetermined variation in the elevation of the blade housing 16 through the crank arms 31 and 32 in connection with the lugs 27 and 28. Such vertical adjustment is accompanied by a relative sliding between the guide members 45 and panels 41 and 42 which, as noted above, cooperate to prevent unwanted lateral shifting of the blade housing 16.

A forwardly projecting rigid pin 48 is located on the central front of the rear frame portion 6 at an elevation approximating the height of the suspension bar body portions 20 and 21. A pair of rigid stabilizing arms 49 and 50 each have rear ends pivotally engaged with the pin 48 for rotation in a vertical plane transverse to the mower and front ends respectively pivotally engaged with the suspension bar rear ends 22 and 23 for rotation in a vertical plane extending generally toward the pin 48. Thus, the rear ends 22 and 23 of the suspension bars 17 and 18 are free to move independently and generally vertically in an arc about the pin 48 but cannot significantly shift laterally with respect to the mower.

Steering for the mower is obtained through any suitable steering wheel or bar (not shown) connected to a steering shaft 51 which rotates a gear 52 engaged with a steering rack 53 which is, in turn, associated with tie rods 54 connected with wheel spindles 55. The tie rods 54 respectively terminate in suitable ball joints whereby the steering system does not interfere with the rocking of the front axle rod 8 described above. The stabilizing arms 49 and 50 afford accurate trailing characteristics to the blade housing suspension, and also avoid undue strain of the various parts, particularly the connections between the axle rod 8 and the suspension bars 17 and 18.

In operation, the mower is driven forwardly through a suitable connection (not shown) between the engine 4 and rear wheels 7. The blade 2 may be simultaneously driven by the engine 4 through the belt 5. When one of the front wheels 9 contacts a bump or raised ground portion not contacted by the other front wheel 9, the front axle rod 8 correspondingly pivots about the bolt 15, thus causing one or the other of the suspension bars 17, 18 to rise, producing a corresponding temporary elevation of one side of the blade housing 16. Thus, under such a condition, the housing will be supported by the raised front wheel 9, the other front wheel 9 and the trailing wheel 25 or 26 directly behind the latter front wheel. The raised condition will be continued by the bump contacting the trailing wheel 25 or 26 behind the raised front wheel. This reduces the tendency for "scalping" which would otherwise be present. On the other hand, if one of the front wheels 9 strikes a hole or depression in the ground, the rear wheels 25 and 26 cooperating with the other front wheel 9 will tend to maintain the housing 16 in a level condition thereby to avoid "scalping" the edge of the depression. Likewise, when the depressed front wheel passes over the depression and the aligned rear wheel 25 or 26 enters the depression, the two front wheels, cooperating with the other rear wheel, will provide similar support for the housing 16. Cutting height is easily adjusted without interference with the described suspension system and even during mower operation by merely changing the circumferential position of the adjusting lever 38 as noted above.

It is to be understood that while one form of this invention has been illustrated and described it is not to be limited thereto except and so far as such limitations are included in the following claims.

What I claim and desire to secure by letters patent is:

1. In a mower of the horizontal rotary blade type:
   a. a front axle means supported between a pair of ground contacting front wheels, a longitudinal frame member extending rearwardly of said axle means, a blade housing positioned behind said front axle means,
   b. means connecting said front axle means to said longitudinal frame member permitting vertical movement of said front wheels with respect to said longitudinal frame member,
   c. a pair of elongated, rigid, laterally spaced apart suspension bars having front ends respectively supported adjacent said front wheels in an elevated position on said front axle means, said suspension bars having body portions extending rearwardly of said front axle means and rear ends extending downwardly and terminating adjacent the ground, ground contacting support wheels mounted on said suspension bar rear ends and providing trailing support for said suspension bars, and
   d. elevation adjusting means suspending said blade housing from said suspension bar body portions, said front axle means including an inverted channel member having walls in which the front axle rod is located and the walls of the channel member will prevent shock on the mower housing while permitting the rocking motion of the axle.

2. In a mower of the horizontal rotary blade type:
   a. a front axle means supported between a pair of ground contacting front wheels, a longitudinal frame member extending rearwardly of said axle means, a blade housing positioned behind said front axle means,
   b. means connecting said front axle means to said longitudinal frame member permitting vertical movement of said front wheels with respect to said longitudinal frame member,
   c. a pair of elongated, rigid, laterally spaced apart suspension bars having front ends respectively supported adjacent said front wheels in an elevated position on said front axle means, said suspension bars having body portions extending rearwardly of said front axle means and rear ends extending downwardly and terminating adjacent the ground, ground contacting support wheels mounted on said suspension bar rear ends and providing trailing support for said suspension bars,
d. elevation adjusting means suspending said blade housing from said suspension bar body portions,
e. said longitudinal frame member terminating rearwardly in a rear frame portion supported between a pair of ground contacting rear wheels, and including stabilizing means connected between said rear frame portion and said suspension bars.

3. The mower as set forth in claim 2 wherein:
a. said support wheels are located adjacent said rear wheels.

4. The mower as set forth in claim 2 wherein said stabilizing means includes:
a. a central, forwardly projecting rigid pin on said rear frame portion and elevated to a position approximating the height of said suspension bar body portions and a pair of rigid stabilizing arms,
b. said stabilizing arms each having a rear end pivotally engaged with said rigid pin for rotation in a vertical plane transverse to said mower and a front end pivotally engaged with said respective suspension bar rear ends for rotation in a vertical plane extending generally toward said rigid pin.

5. In a mower of the horizontal rotary blade type:
a. a front axle means supported between a pair of ground contacting front wheels, a longitudinal frame member extending rearwardly of said axle means, a blade housing positioned behind said front axle means,
b. means connecting said front axle means to said longitudinal frame member permitting vertical movement of said front wheels with respect to said longitudinal frame member,
c. a pair of elongated, rigid, laterally spaced apart suspension bars having front ends respectively supported adjacent said front wheels in an elevated position on said front axle means, said suspension bars having body portions extending rearwardly of said front axle means and rear ends extending downwardly and terminating adjacent the ground, ground contacting support wheels mounted on said suspension bar rear ends and providing trailing support for said suspension bars, and
d. elevation adjusting means suspending said blade housing from said suspension bar body portions, said elevation adjusting means including two pairs of laterally spaced apart lugs secured to said blade housing, and projecting upwardly therefrom, front and rear torsion bars extending in parallel spaced apart relation transversely of said mower and over said blade housing, said torsion bars respectively having a pair of parallel spaced apart crank arms projecting radially and generally forwardly therefrom and being pivotally connected to said respective lugs, said torsion bars having opposite ends projecting through said respective suspension bars and forming rotatable bearing connections therewith, a radially and generally upwardly projecting crank arm on each of said torsion bars, said upwardly projecting crank arms being longitudinally aligned with respect to said elongated frame member, a tension link pivotally connected to said upwardly projecting crank arms and extending therebetween to prevent independent rotation of said torsion bars, an adjusting lever rotatably fixed to one of said torsion bars, and means for locking said adjusting lever in predetermined circumferential positions.

6. The mower as set forth in claim 5 wherein said elevation adjusting means includes:
a. upstanding parallel, spaced apart panels fixed to said blade housing and extending longitudinally of said mower adjacent respective opposite ends of said torsion bars, vertical slots in said panels and receiving said torsion bars ends therethrough, and
b. guide members slideably engaged between said torsion bar ends and said vertical slots for guiding relative vertical movement therebetween but preventing substantial lateral movement of said blade housing with respect to said suspension bars.

7. The mower as set forth in claim 6 wherein said locking means comprises
a. a device fixed to one of said panels and having receiving means selectively engageable with said adjusting lever to adjust the height of said blade housing with respect to said suspension bars.

* * * * *